SUPERCONDUCTORS HAVING A FLEXIBLE SUBSTRATE AND A COATING SUBSTANTIALLY OF $NbSn_3$
Filed June 30, 1967
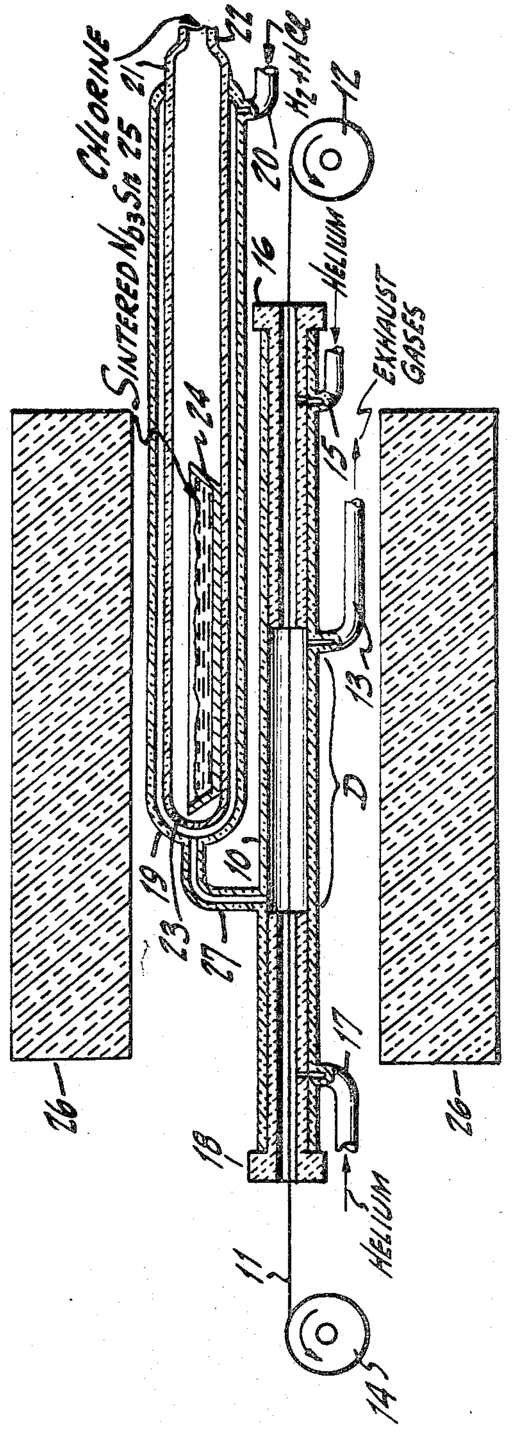
JOSEPH J. HANAK & JOHN L. COOPER INVENTORS
BY Abraham Sherman
ATTORNEY United States Patent Office 3,488,165

Patented Jan. 6, 1970

3,488,165

SUPERCONDUCTORS HAVING A FLEXIBLE SUBSTRATE AND A COATING SUBSTANTIALLY OF $NbSn_3$

Joseph J. Hanak, Trenton, and John L. Cooper, Hightstown, N.J., assignors to RCA Corporation, a corporation of Delaware Continuation-in-part of application Ser. No. 420,679, Dec. 23, 1964, which is a division of application Ser. No. 112,853, May 26, 1961. This application June 30, 1967, Ser. No. 650,463.
Int. Cl. C23c *11/02*
U.S. Cl. 29—194 7 Claims

ABSTRACT OF THE DISCLOSURE

A superconducting material is provided comprising an elongated flexible substrate such as a ribbon or wire. The substrate consists of any refractory metal or alloy or clad metal having a melting point above 1000° C. On the substrate is a deposited coating consisting of the crystalline reaction product of niobium chloride vapors and tin chloride vapors and hydrogen. The coating consists essentially of niobium tin, and as deposited it is visibly crystalline, non-porous, homogenous or single phase, substantially free of any of the materials of the substrate, and has a density greater than 95% of the maximum theoretical density of $Nb_3Sn$.

The invention described herein was made in the course of, or under contract with the Air Force.

RELATED APPLICATIONS

This application is a continuation-in-part of application Ser. No. 420,679, filed Dec. 23, 1964, now abandoned which was a division of application Ser. No. 112,853, filed May 26, 1961, issued Aug. 23, 1966 as U.S. Patent 3,268,362.

BACKGROUND OF THE INVENTION

Field of the invention

This invention relates to improved superconducting materials, and to improved methods of making said materials.

Description of the prior art

An important parameter of superconducting materials is the temperature at and above which the material ceases to be superconducting. This parameter is a fixed characteristic of each superconducting material, and is known as the critical temperature $T_c$. Another important parameter that is characteristic of each superconductor is the critical magnetic field at which it ceases to be superconducting. Materials which exhibit a high value for $T_c$ also tend to exhibit a high value of the critical magnetic field.

Powerful electromagnets have been made by forming a superconductive material into a coil, maintaining the coil at a temperature below the critical temperature of the material, and passing a current through the coil. Since the electrical resistance of a superconductor below its critical temperature is essentially zero, or at any rate is less than can be detected, a large current can be sent through the coil with no heat dissipation, and a powerful magnetic field can thus be established. However, the magnetic field associated with the flow of current in a conductor also increases as the current increases, and when this magnetic field reaches the critical value for the coil material, the coil ceases to be superconducting. At each temperature, there is a critical current $I_c$ which is the largest that the material can carry for a given external magnetic field.

In order to maintain a high current in such coils at high magnetic fields, the material utilized should have a high critical temperature $T_c$, since, the critical magnetic field $H_{c2}$ is high for hard superconductors which exhibit a high $T_c$.

The superconducting material niobium tin or niobium stannide, which preferably corresponds to the composition $Nb_3Sn$, is a hard superconductor having a critical temperature $T_c$ of about 18°K. This material is prepared according to one method of the prior art by running molten tin over powdered niobium in a sealed quartz tube maintained at 1200° C. However, the material thus synthesized tends to be porous, impure and brittle, it does not have a metallic appearance or luster, and cannot be formed into coils. Attempts have been made to fill a metal tube with powdered $Nb_3Sn$, wind the tube into a coil, and heat the tube so as to sinter the powdered $Nb_3Sn$ core to a compact mass. As coils with many turns are required, such expedients are cumbersome and have not hitherto been reported as successful in making powerful electromagnets.

Accordingly, it is an object of this invention to provide improved superconducting materials.

Another object of this invention is to provide improved methods of fabricating improved superconducting materials.

SUMMARY OF THE INVENTION

These and other objects are obtained, according to the invention, by providing an article of manufacture comprising a flexible substrate covered with a non-porous high density coating of crystalline niobium tin. A continuous process for depositing a coating of crystalline niobium tin on a flexible substrate such as a wire, tape, or filament, ribbon, or the like has now been found, which comprises the steps of continuously passing the flexible substrate to be coated through a mixture consisting essentially of hydrogen and the mixed vapors of niobium chloride and tin chloride, and heating only the flexible substrate and the portion of the vapors in the immediate vicinity of said substrate to a temperature sufficient to induce the reduction of at least a portion of the chlorides and deposit the metal portions of the reduced chlorides on the substrate only.

THE DRAWING

The invention will be described in greater detail in conjunction with the accompanying drawing, in which the single figure is a schematic diagram of apparatus useful in the practice of the invention.

THE PREFERRED EMBODIMENTS

Example I

The apparatus utilized in this example comprises a refractory reaction tube 10 through which the substrate 11 to be coated is continuously fed. The elongate flexible substrate to be coated with niobium tin may be a ribbon or tape or wire or filament or the like, and suitably consists of a metal such as tungsten, tantalum, molybdenum, and the like. In this example, substrate 11 consists of tungsten wire. The bare substrate is unrolled from one spool 12, and the coated substrate is rolled up on another spool 14. The wire 11 enters the reaction tube 10 through a small-diameter graphite plug 16 at one end of the tube, and leaves the tube through a similar graphite plug 18 at the other end of the tube. The wire 11 is in actual contact with graphite plugs 16 and 18, which are utilized as electrical leads for resistance heating of the portion of wire 11 within reaction tube 10. Furthermore, as explained below, this method of heating enables heating only the wire to a temperature above that of the reaction tube 10. The reaction tube 10 includes an outlet 13 attached to the central portion thereof and advantageously includes an inlet 15 near one end of the tube, and another inlet 17 near the other end of said tube. A double-walled refractory delivery tube 19 is connected at one end by a passageway 27 to the central portion of reaction tube 10. At the other end of the delivery tube 19 is an inlet 20. The inner portion or chamber 21 of delivery tube 19 has an inlet 22 at one end, and an outlet such as an aperture 23 at the other end adjacent passageway 27. Positioned in the inner portion or chamber 21 of delivery tube 19 is a furnace boat 24 containing a mass 25 of niobium tin, $Nb_3Sn$. The niobium tin 25 may, for example, be the brittle porous material formed by the direct synthesis of the elements as described above. A furnace 26 keeps the reaction tube 10 and that portion of delivery tube 19 which contains the niobium tin 25 at a predetermined temperature, preferably within the range from about 700° C. to 750° C.

In this example, wire 11, which consists of tungsten, has originally a diameter of 0.12 mm., and is pulled through reaction tube 10 at a steady rate of 9.7 meters per hour. The wire makes electrical contact with the bores of plugs 16 and 18. An alternating current is impressed across graphite plugs 16 and 18 and through wire 11. The portion of wire 11 within reaction tube 10 is thereby heated to a relatively high temperature without heating tube 10 and its entire contents of mixed gases and vapors described below. Only that portion of the vapors which is in the immediate vicinity of the wire is heated to a temperature sufficient to induce reduction of the vapors.

The reacting materials are introduced into reaction tube 10 by passing a stream of chlorine through inlet 21. The rate of flow of the chlorine depends on the apparatus dimensions, and the rate of deposit of niobium tin desired. The arrows in the drawing indicate the direction of gas flow. In this example, reaction tube 10 is a quartz tube 42 inches long, and ⅜ inch in inside diameter. The rate of flow of the chlorine is about 95 ml. per minute. The chlorine passes over the niobium tin mass 25 and reacts therewith to form the mixed vapors of $NbCl_5$ and $SnCl_4$. Since there are three Nb atoms for every Sn atom in the niobium tin mass 25, the ratio of niobium chloride molecules to tin chloride molecules in the mixed vapors is thus maintained at about the desired ratio of 3:1. The stream of chlorine and the mixed vapors of niobium chloride and tin chloride leave chamber 21 through aperture 23, and flow through passageway 27 into reaction tube 10. After the flow of the chloride vapors has been established, a stream of hydrogen is passed through inlet 20, the outer portion of delivery tube 19, and passageway 27 into the reaction tube 10. In this example, the rate of flow of the hydrogen is about 445 ml. per minute. The double-wall arraganment of delivery tube 19 thus prevents the hydrogen from mixing with and reducing the chloride vapors prior to their introduction into reaction tube 10. Advantageously, a stream of an inert gas such as helium or argon is passed into reaction tube 10 at inlets 15 and 17 at a rate of about 1 liter per minute. The flow of the inert gas keeps the mixture of hydrogen and chloride vapors in the center of reaction tube 10, and prevents the mixture from leaking out through plugs 16 and 18. The temperature of about 700° C. to 750° C. maintained within reaction tube 10 by furnace 26 is sufficient to keep the niobium chloride and tin chloride volatile, but insufficient to induce substantial reduction of these chlorides by hydrogen. However, the current passing between graphite plugs 16 and 18 and through the portion of wire 11 inside reaction tube 10 heats only the wire and the portion of the chloride vapors in the immediate vicinity of the wire to a temperature sufficient to reduce at least a portion of said chlorides. Heating the wire at a temperature range of about 800° C. to 1400° C. has been found satisfactory. In this example, wire 11 was heated to about 1050° C. The metal portions of the reduced chlorides, the unreacted hydrogen, and the inert carrier gas, pass out of tube 10 at outlet 13. Since the chlorides are reduced in the same proportion as their concentration, the metal portions of the reduced chlorides, that is, the niobium and the tin, are present in the ratio of three atoms of niobium to one atom of tin, and therefore deposite on wire 11 in that ratio. The diameter of wire 11 after coating is 0.28 mm. in this example.

An advantage of the method of this invention is that the niobium tin is deposited essentially on wire 11 only, and not at all or only slightly on the walls of reaction tube 10. If the niobium stannide is permitted to deposit on the walls of reaction tube 10, the passageway 27 is soon blocked, and it is necessary to halt the coating operation and to clean reaction tube 10. The coating operation in such case becomes a discontinuous batch-type process. In contrast, in the method of the invention, the operation is a continuous flow process, and the coating can proceed steadily without interruption on any desired length of wire.

Another feature of the invention is the nature of the niobium tin coating formed. The thickness of the coating may be varied from a few Angstroms to a few mm. In each case, the coating is visibly crystalline and nonporous. Some superconducting characteristics of this coating, including the critical temperature and critical magnetic field, are as good as that of the best niobium stannide prepared according to the prior art. The critical current of the coating accordance to the invention is higher than that of prior niobium stannide coatings. Moreover, the coating according to the invention has a metallic appearance and luster and is more dense than niobium tin made according to the prior art. The theoretical maximum density of $Nb_3Sn$, assuming a perfect crystal lattice, is 8.92 grams per $cm.^3$. The density of sintered niobium tin made from the elements according to the prior art is only about 7.0 grams per $cm.^3$. The density of the prior art sintered niobium tin is thus about 78% of the theoretical maximum density. Even if treated in acid for 65 hours and compressed at a pressure of 56,000 p.s.i., the density of the prior art niobuim tin does not rise above 92% of the theoretical maximum density. In contrast, the density of the untreated and unpressed crystalline niobium tin coating as deposited on a flexible substrate according to the invention is more than 95% of the theoretical maximum limiting density of niobium tin, that is, more than 8.47 grams per $cm.^3$.

The thinner the coating of niobium tin on the flexible substrate 11, the more flexible the coating is. However, the magnitude of the current carried by the niobium tin layer decreases approximately linearly as its thickness decreases. It is therefore preferred to maintain the thickness of the niobium tin coating in the range of about 0.1 micron to 1 millimeter. Within this thickness range for the flexible niobium tin coating, the coated flexible substrate is readily formed into magnet coils without cracking the coating.

Another feature of the invention is that the substrate may be non-superconductive, and may consist of materials different from the coating, so that the coating is substantially free of any of the materials of the substrate, whereas other superconductive materials have required either a superconductive substrate, or required a substrate which was one of the constituents of the superconductive coating. Moreover, the substrate according to the invention may be any metal or alloy or clad metal which is sufficiently refractory to withstand the deposition temperature, i.e., the substrate may be any flexible material having a melting point about 1000° C. Furthermore, the niobium tin coating according to the invention is uniform, homogeneous, and single phase through its thickness, whereas other superconductive materials made by diffusion are not homogenous, and vary in composition with increasing depth. Due to this uniformity, any section of the instant superconductive coating can carry as much current as any other section, whereas superconductive coatings made by diffusion vary considerably in the thickness of the active $Nb_3Sn$ coating along the length of the coating surface, and hence the total current which they can carry is limited by the current carrying capacity of their thinnest portion.

Example II

The wire or other form of substrate coated according to the invention need not be a pure metal, but may be any alloy having a melting point about 1000° C., such as nickel-chromium alloys, tungsten-tantalum alloys, niobium-tantalum alloys, rhodium-palladium alloys, and the like. In this example, wire 11 consists of a tantalum-tungsten alloy, and is 0.18 mm. in diameter before coating. The rate of flow of the chlorine is 79 ml. per minute, and of the hydrogen is 260 ml. per minute. The wire 11 is pulled through reaction tube 10 at a continuous rate of 13.3 meters per hour. The portion of wire 11 between the graphite plugs is heated to about 1090° C., and acquires a niobium tin coating 0.04 mm. thick. The coated wire on reel 14 is thus 0.26 mm. in diameter.

Example III

In accordance with another embodiment of the invention, hydrogen chloride gas is admixed with the stream of hydrogen passed into reaction tube 10 by way of inlet 20. The hydrogen chloride is preferably from 5 to 10 volume percent of the hydrogen-hydrogen chloride mixture. In this example the mixture is formed by passing 28 ml. per minute hydrogen chloride and 330 ml. per minute hydrogen into inlet tube 20. The wire 11 consists of tantalum, about 0.24 mm. in diameter, is heated to about 1150° C. by the current passed between graphite plugs 16 and 18, and is passed through the reaction tube 10 at the rate of 15 meters per hour. Chlorine is passed in at the rate of 75 ml. per minute. The reaction between the chlorine gas and the $Nb_3Sn$ mass 25 in Examples I and II may be expressed by the chemical equation $$Nb_3Sn + 9\tfrac{1}{2}Cl_2 \rightarrow 3NbCl_5 + SnCl_4$$

The subsequent reduction by hydrogen of the mixed chlorides in the immediate vicinity of the wire appears to be a reversible reaction which may be expressed by the chemical equation $$3NbCl_5 + SnCl_4 + 9\tfrac{1}{2}H_2 \rightleftarrows Nb_3Sn + 19HCl$$

In view of the last equation, it would seem that passing HCl into the reaction tube 10 would drive the reaction in the reverse direction 29 to remove the niobium tin coating from the wire. However, by substituting partial pressures for the concentrations of the reactants in the gas phase, the equilibrium constant K for the reaction at a particular temperature can be written as $$K = \frac{[P_{HCl}]^{19}}{[P_{NbCl_5}]^3 [P_{SnCl_4}][P_{H_2}]^{9.5}}$$

where each P represents the partial pressure of the gas or vapor indicated by the subscript. It will be noted that the exponent for the partial pressure due to HCl is greater by about 10 than the exponent of any other reactant. When the ratio of the numerator to the denominator in the last equation is exactly equal to K, the reaction is at equilibium, and there is no change in the concentrations or partial pressures of the constituents. When the ratio of the numerator to the denominator is less than K, then the reaction proceeds in the forward direction and niobium tin will be deposited. At any one temperature K remains constant, but experiments indicate that, with increasing temperature, K increases. Accordingly, other conditions being the same, at higher temperatures the deposition of niobium tin can proceed in the presence of larger partial pressures of hydrogen chloride that can be tolerated at lower temperatures. In the method of this invention, the wire and the immediately adjacent portion of the chloride vapors are heated by means of the current impressed between the two graphite plugs, to a temperature sufficient to induce the reduction of the chloride vapors even in the presence of the hydrogen chloride which has been passed into the reaction tube together with the hydrogen. However, the reduction of the remaining portions of the chloride vapors will be more difficult because of the hydrogen chloride that has been introduced. It is thus seen that the addition of hydrogen chloride to the hydrogen passed into the reaction tube tends to prevent the deposition of nobium tin on the walls of the tube. In this example, the final thickness of the coated wire is 0.31 mm.

Example IV

In this embodiment of the invention, the furnace boat 24 contains granulated or powdered niobium and granulated or powdered tin. The stream of chlorine passed into the reaction tube through inlet 22 reacts with the metallic niobium and tin to form niobium chloride and tin chloride vapors. Alternatively, the niobium and tin may be in separate furnace boats. The ratio of niobium to tin present is preferably such that the molar ratio of niobium chloride to tin chloride in the mixed vapors is maintained within the ratio of 4:1 to 1:1. The rate of flow of the chlorine in this example is about 85 ml. per minute. The wire 11, which in this example consists of platinum-clad metal, such as platinum-clad molybdenum, is 0.18 mm. in diameter, and is passed through the reaction tube at the rate of 5.5 meters per hour. The temperature of wire 11 is about 1100° C. The hydrogen-hydrogen chloride mixture passed into the reaction tube consists of a flow of about 390 ml. per minute hydrogen and a flow of about 33 ml. per minute hydrogen chloride, and thus contains about 7.8 volume percent hydrogen chloride. The thickness of the coated wire thus produced is 0.40 mm. The density of the crystalline niobium tin coating deposited on the platinum-clad wire of this example is about 8.9 grams per $cm.^3$, which is more than 95% of the theoretical maximum density. In fact, as this example shows, flexible substrates may be provided with a flexible, lustrous, homogenous, crystalline niobium tin coating having a density more than 95%, and even more than 99% of the theoretical density of a perfect niobium stannide crystal lattice.

Various modifications and variations of the process may be made without departing from the spirit and scope of the instant invention. For example, two furnace boats may be utilized, one containing niobium chloride and the other containing tin chloride. A stream of an inert carrier gas such as helium or argon can then be swept over the chlorides into the reaction tube, thus introducing the mixed vapors of the chlorides. Although the examples above have all described the coating of a wire, it will be understood that a flexible ribbon or filament or tape may be similarly coated with niobium tin. The niobium tin coating need not be stoichiometric, since the amount of niobium in useful niobium tin coatings may vary from about 75 to 82 atomic percent.

What is claimed is:

1. An article of manufacture comprising a flexible substrate covered with a coating consisting substantially of crystalline $Nb_3Sn$, a reaction product vapors and tin chloride vapors and hyrrogen, characterized in that said substrate has a melting point above 1000° C., and said coating is visibly crystalline and non-porous and homogenous.

2. The article as in claim 1, wherein said substrate having a melting point above 1000° C. is selected from the group consisting of metals and alloys and clad metals.

3. The article as in claim 1, wherein said coating has a density greater than 95% of the maximum theoretical density of $Nb_3Sn$.

4. An article of manufacture comprising a flexible substrate covered with a coating consisting substantially of the crystalline reaction product of niobium chloride vapors and tin chloride vapors and hydrogen, characterized in that (a) said substrate is selected from the group consisting of those metals, alloys and clad metals which have a melting point above 1000° C.;

(b) said coating is substantially homogenous;

(c) said coating has a density greater than 8.47 grams per cm.$^3$; and (d) said coating as deposited is substantially free from any of the constituents of said substrate.

5. An article of manufacture comprising a flexible substrate covered with a coating consisting substantially of the crystalline reaction product of niobium chloride vapors and tin chloride vapors and hydrogen, said substrate being a material selected from the group consisting of metals and metallic alloys and metals clad with another metal, characterized in that said coating as deposited is visibly crystalline and non-porous, the amount of niobium in said coating varying from about 75 to 82 atomic percent.

6. An article of manufacture as in claim 5, characterized in that said coating as deposited has a density greater than 8.47 grams per cm.$^3$.

7. An article of manufacture as in claim 5, characterized in that said coating as deposited is substantially free of any of the materials of said substrate, and has a density greater than 95% of the maximum theoretical density of $Nb_3Sn$.

References Cited

UNITED STATES PATENTS

| | | | |
|---|---|---|---|
| 3,293,008 | 12/1966 | Allen | 29—194 |
| 3,181,936 | 5/1965 | Denny | 29—194 |

HYLAND BIZOT, Primary Examiner

U.S. Cl. X.R.

29—191.6, 198

UNITED STATES PATENT OFFICE
CERTIFICATE OF CORRECTION

Patent No. 3,488,165 January 6, 1970

Joseph J. Hanak et al.

It is certified that error appears in the above identified patent and that said Letters Patent are hereby corrected as shown below:

Column 3, line 53, "arraganment" should read -- arrangement --. Column 4, line 5, "deposite" should read -- deposit --; line 28, "accordance" should read -- according --. Column 6, lines 61 and 62, cancel "vapors and tin chloride vapors and hyrrogen".

Signed and sealed this 10th day of November 1970.

(SEAL)
Attest:

Edward M. Fletcher, Jr.
Attesting Officer

WILLIAM E. SCHUYLER, JR.
Commissioner of Patents